(No Model.)

H. B. FORD.
APPARATUS FOR COOLING WATER.

No. 477,893. Patented June 28, 1892.

Witnesses:
Murray C. Boyer.
A. V. Broupe.

Inventor:
Henry B. Ford
by his Attorneys
Howson & Howson

UNITED STATES PATENT OFFICE.

HENRY B. FORD, OF PHILADELPHIA, PENNSYLVANIA.

APPARATUS FOR COOLING WATER.

SPECIFICATION forming part of Letters Patent No. 477,893, dated June 28, 1892.

Application filed November 13, 1890. Serial No. 371,302. (No model.)

*To all whom it may concern:*

Be it known that I, HENRY B. FORD, a subject of the Queen of Great Britain and Ireland, and a resident of Philadelphia, Pennsylvania, have invented certain Improvements in Apparatus for Cooling Water, of which the following is a specification.

The object of my invention is to construct a device by which water can be cooled and distributed through a system of pipes, as fully described hereinafter.

Figure 1:
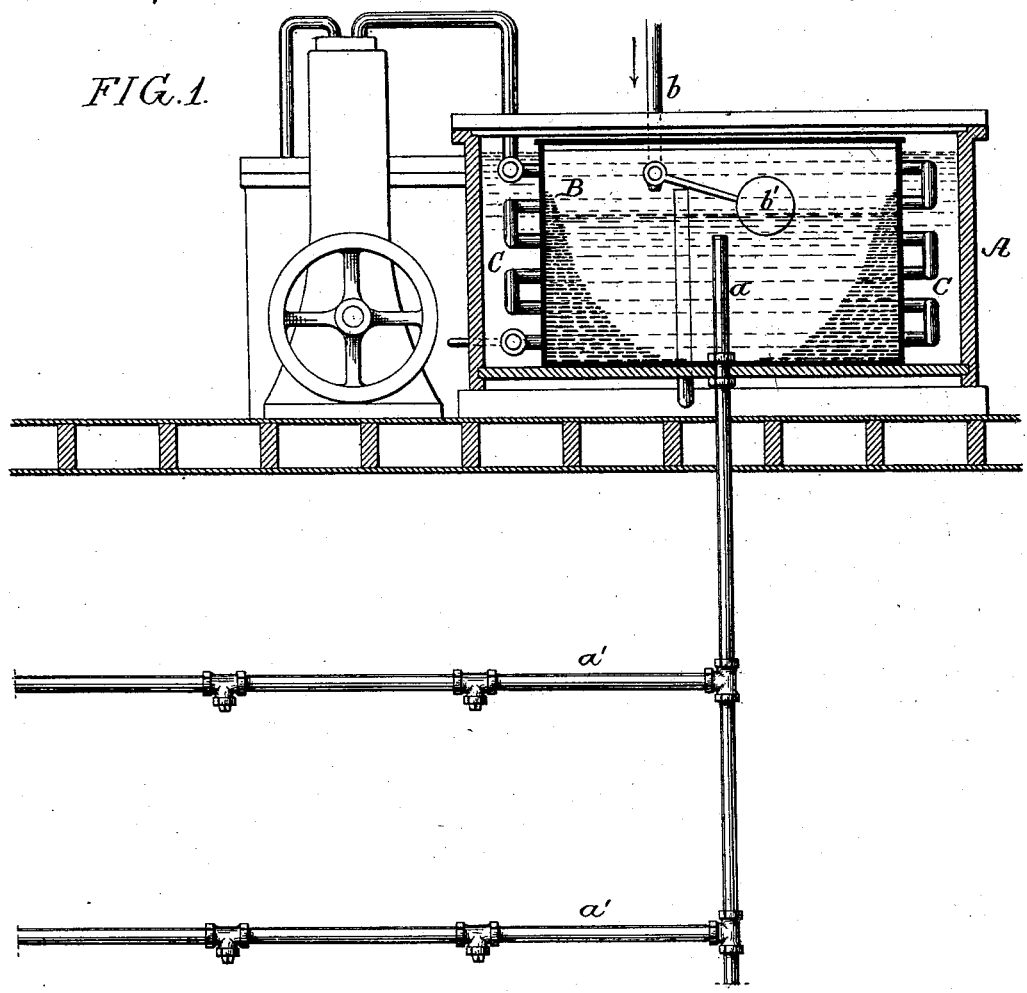
Figure 2:
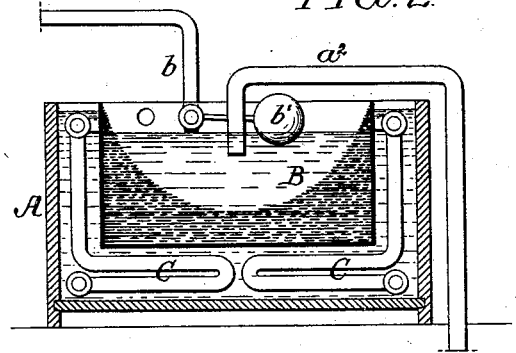

In the accompanying drawings, Figure 1 is a sectional view of one form of mechanism for carrying my invention into effect. Fig. 2 is a view of a modification.

Referring to Fig. 1, A is a casing of any form desired. B is a tank containing the water which is to be cooled. Surrounding this tank are the coils C from the compressor and other mechanism forming an ice-making plant. The cooling fluid passes through these pipes, which are preferably immersed in brine contained between the tank and outer casing. The outlet $a$ from the water-tank is situated at a central point in the tank. The water at this point would be the last to freeze, owing to its distance from the sides. Consequently the water withdrawn through this pipe will always be cooled by contact with the ice formed around the edge of the tank, but will be drawn off before it reaches the freezing-point. The inlet $b$ to the tank may be provided with the usual ball-valve $b'$, which cuts off the supply of water when the water reaches a certain level.

I prefer to place the tank and the ice-forming mechanism, when cooling water for a large building, on the top floor and allow the water to flow through the outlet-pipe to the branch pipes $a'$ and from these pipes to be distributed to different rooms of the building.

This system is especially applicable for use in large office-buildings and flats where individual water-coolers are now placed in the different rooms of the building. By this system the water-coolers are dispensed with and the trouble and expense of transporting the ice entirely avoided.

The ice in the tank illustrated in Fig. 1 is formed, as shown, by the dark dotted lines in the drawings. Thus the water in the tank is surrounded by a film of ice.

In Fig. 2 I have shown the coils C passing under the tank. In this instance I prefer to make the outlet $a^2$ in the form of a siphon, so that the outlet-pipes will not pass through or in close proximity to the cooling agent, although in some instances the outlet-pipe may be covered with non-conducting material and pass through the chamber containing the brine.

I claim as my invention—

The combination of the casing, a tank within said casing for containing the water to be cooled, a pipe for distributing the cold water, and an outlet from the center of the tank leading to said pipe, with a coil between the tank and the casing through which the refrigerating medium passes, substantially as described.

In testimony whereof I have signed my name to this specification in the presence of two subscribing witnesses.

HENRY B. FORD.

Witnesses:
EUGENE ELTERICH,
WILLIAM A. BARR.